(12) United States Patent
Vendeirinho

(10) Patent No.: US 10,054,372 B2
(45) Date of Patent: Aug. 21, 2018

(54) THERMAL ENERGY STORAGE SYSTEM

(71) Applicant: David Vendeirinho, Charavines (FR)

(72) Inventor: David Vendeirinho, Charavines (FR)

(73) Assignee: David Vendeirinho, Charavines (FR)

( * ) Notice: Subject to any disclaimer, the term of this patent is extended or adjusted under 35 U.S.C. 154(b) by 619 days.

(21) Appl. No.: 14/569,028

(22) Filed: Dec. 12, 2014

(65) Prior Publication Data

US 2015/0176920 A1    Jun. 25, 2015

(30) Foreign Application Priority Data

Dec. 20, 2013   (FR) ..................................... 13 03020
Mar. 5, 2014    (EP) ..................................... 14157768

(51) Int. Cl.
F28D 17/00    (2006.01)
F28D 20/00    (2006.01)
F24D 11/00    (2006.01)

(52) U.S. Cl.
CPC ........ F28D 20/0056 (2013.01); F24D 11/006 (2013.01); F24D 11/003 (2013.01);
(Continued)

(58) Field of Classification Search
CPC ......... F28D 20/0056; F28D 2020/0082; F28D 2020/0078; F24D 11/006; F24D 11/003;
(Continued)

(56) References Cited

U.S. PATENT DOCUMENTS 2,083,732 A * 6/1937 Moore ............... B01D 53/0423
                                                    165/10
2,462,557 A * 2/1949 Santee .................... F24D 15/04
                                                    165/49
(Continued)

FOREIGN PATENT DOCUMENTS

DE          19826625        12/1999
DE          102004052447     4/2006
(Continued)

OTHER PUBLICATIONS

Institut National De La Propriete Industrielle, Preliminary Search Report, dated Oct. 14, 2014 for FR1303020.
(Continued)

*Primary Examiner* — Claire Rojohn, III
(74) *Attorney, Agent, or Firm* — Kevin R. Erdman; Brannan Sowers & Cracraft PC

(57) ABSTRACT

A device including first and second heat accumulators, each including thermal energy storage containers. Each container includes an insulating enclosure containing earth crossed by at least one first line for the circulation of a first heat transfer fluid and at least one second line for the circulation of a second heat transfer fluid. For each accumulator, the first lines of the containers are connected in parallel and the second lines of the containers are series-connected. The heating device includes a device for delivering thermal energy to the first heat transfer fluid connected to the first and second accumulators by a first circuit for distributing the first heat transfer fluid capable of selectively circulating the first heat transfer fluid in the first line of each container of the first accumulator or in the first line of each container of the second accumulator.

11 Claims, 5 Drawing Sheets

Fig 2

(52) U.S. Cl.
CPC .... *F24D 11/009* (2013.01); *F28D 2020/0078* (2013.01); *F28D 2020/0082* (2013.01); *F28F 2210/08* (2013.01); *F28F 2210/10* (2013.01); *Y02E 60/142* (2013.01)

(58) Field of Classification Search
CPC . F24D 11/009; F28F 2210/08; F28F 2210/10; Y02E 60/142
USPC .......................................................... 165/10
See application file for complete search history.

(56) References Cited

U.S. PATENT DOCUMENTS

| | | | | |
|---|---|---|---|---|
| 2,559,870 A * | 7/1951 | Gay | F24D 11/0257 | 126/632 |
| 2,689,090 A * | 9/1954 | Wetherbee | F24D 11/02 | 126/584 |
| 2,780,415 A * | 2/1957 | Gay | F24D 11/0257 | 137/2 |
| 3,170,269 A * | 2/1965 | Dunnington | E04B 1/08 | 52/293.3 |
| 3,220,470 A * | 11/1965 | Balch | E02D 3/115 | 159/902 |
| 3,354,654 A * | 11/1967 | Vignovich | F17C 3/005 | 405/56 |
| 3,500,596 A * | 3/1970 | Andersson | E04B 1/3483 | 52/275 |
| 3,965,972 A * | 6/1976 | Petersen | F24F 5/0046 | 165/45 |
| 4,000,851 A * | 1/1977 | Heilemann | F24D 11/003 | 126/400 |
| 4,051,999 A * | 10/1977 | Granger | F24D 11/007 | 126/400 |
| 4,139,321 A * | 2/1979 | Werner | F28D 20/0056 | 126/400 |
| 4,173,304 A * | 11/1979 | Johnson | F24D 11/007 | 126/620 |
| 4,289,115 A * | 9/1981 | O'Hanlon | F24D 11/003 | 126/620 |
| 4,344,414 A * | 8/1982 | Balch | F24D 11/0221 | 126/638 |
| 4,350,200 A * | 9/1982 | McElwain | F24D 11/0221 | 165/48.2 |
| 4,452,229 A * | 6/1984 | Powers | F28D 20/0056 | 126/400 |
| 4,527,618 A * | 7/1985 | Fyfe | F24D 11/0221 | 126/635 |
| 4,920,757 A * | 5/1990 | Gazes | F25B 41/04 | 62/181 |
| 5,339,798 A * | 8/1994 | Christian | E04B 2/708 | 126/629 |
| 5,372,011 A * | 12/1994 | O'Neal | F24F 3/06 | 165/222 |
| 5,435,380 A * | 7/1995 | Yamada | F24F 5/0017 | 165/104.19 |
| 5,618,134 A * | 4/1997 | Balch | E02D 27/35 | 165/45 |
| 5,941,238 A * | 8/1999 | Tracy | F24D 11/0221 | 126/641 |
| 6,450,247 B1 * | 9/2002 | Raff | F24F 5/0046 | 165/45 |
| 6,705,043 B1 * | 3/2004 | Opdam | A01G 9/243 | 47/17 |
| 7,891,187 B2 * | 2/2011 | Mohr | F28D 20/0056 | 60/641.2 |
| 7,992,631 B2 * | 8/2011 | Brett | F24F 5/0017 | 165/244 |
| 8,561,407 B2 * | 10/2013 | Sines | F03G 7/04 | 60/641.2 |
| 8,733,429 B2 * | 5/2014 | Harrison | F24D 11/0221 | 165/240 |
| 9,310,103 B2 * | 4/2016 | Wildig | F24J 3/083 | |
| 9,491,892 B1 * | 11/2016 | Carlson | F24F 5/0035 | |
| 9,512,828 B2 * | 12/2016 | Marble | F03G 7/04 | |
| 9,518,787 B2 * | 12/2016 | Pilebro | F28D 20/0039 | |
| 2002/0139514 A1 * | 10/2002 | Lagace | F24F 3/1423 | 165/54 |
| 2003/0000680 A1 * | 1/2003 | Schwarz | F28D 20/0052 | 165/45 |
| 2004/0035141 A1 * | 2/2004 | Schmidt | F24D 11/00 | 62/434 |
| 2005/0229613 A1 * | 10/2005 | Beatenbough | F25B 45/00 | 62/149 |
| 2008/0092875 A1 * | 4/2008 | Leifer | F24F 5/0017 | 126/617 |
| 2009/0277602 A1 * | 11/2009 | Yang | F24F 5/0046 | 165/45 |
| 2010/0199669 A1 * | 8/2010 | Gathmann | F03G 6/005 | 60/641.8 |
| 2010/0252232 A1 * | 10/2010 | Reich | F28D 20/0034 | 165/48.1 |
| 2010/0300399 A1 * | 12/2010 | Andreini | F03G 7/00 | 123/205 |
| 2011/0174296 A1 * | 7/2011 | Kalina | F28D 20/0039 | 126/640 |
| 2011/0226447 A1 * | 9/2011 | Mieda | F28D 7/022 | 165/104.12 |
| 2012/0024496 A1 * | 2/2012 | Dossing | F24D 3/10 | 165/97 |
| 2012/0048259 A1 * | 3/2012 | Wagner | F24D 11/003 | 126/585 |
| 2012/0080161 A1 * | 4/2012 | Kelly | F24J 2/067 | 165/10 |
| 2012/0125019 A1 * | 5/2012 | Sami | F24F 5/0046 | 62/79 |
| 2012/0152488 A1 * | 6/2012 | Yatchak | F28D 20/0043 | 165/45 |
| 2012/0255706 A1 * | 10/2012 | Tadayon | F24J 3/081 | 165/47 |
| 2012/0263980 A1 * | 10/2012 | Soukhojak | C09K 5/04 | 429/50 |
| 2013/0056193 A1 * | 3/2013 | Thiers | C09K 5/063 | 165/185 |
| 2013/0104545 A1 * | 5/2013 | Gandy | F24D 11/0214 | 60/641.2 |
| 2013/0111904 A1 * | 5/2013 | Stiesdal | F02C 6/14 | 60/659 |
| 2013/0139995 A1 * | 6/2013 | Kim | F28D 17/00 | 165/10 |
| 2013/0153169 A1 * | 6/2013 | Perryman | F28D 20/021 | 165/10 |
| 2013/0175006 A1 * | 7/2013 | Robinson | F25B 15/09 | 165/104.12 |
| 2013/0199751 A1 * | 8/2013 | Levin | F02G 5/02 | 165/10 |
| 2013/0206356 A1 * | 8/2013 | Pedretti | F28D 20/0056 | 165/10 |
| 2014/0008033 A1 * | 1/2014 | Howes | F28D 20/0056 | 165/10 |
| 2014/0060771 A1 * | 3/2014 | Bell | F24D 11/003 | 165/10 |
| 2014/0102662 A1 * | 4/2014 | Grama | F28D 20/00 | 165/10 |
| 2014/0110080 A1 * | 4/2014 | Bergan | F28D 20/0056 | 165/10 |
| 2014/0138042 A1 * | 5/2014 | Yagi | B60L 1/02 | 165/10 |
| 2014/0251310 A1 * | 9/2014 | Muren | F28F 13/003 | 126/618 |
| 2015/0128931 A1 * | 5/2015 | Joshi | F24J 2/402 | 126/714 |

FOREIGN PATENT DOCUMENTS

| | | |
|---|---|---|
| EP | 1750077 | 4/2006 |
| GB | 2459955 | 11/2009 |

(56) References Cited

FOREIGN PATENT DOCUMENTS

| | | |
|---|---|---|
| WO | WO0161261 | 8/2001 |
| WO | WO2010060524 | 3/2010 |

OTHER PUBLICATIONS

European Patent Office, Search Report for EP14157768, dated Jul. 14, 2014.

* cited by examiner

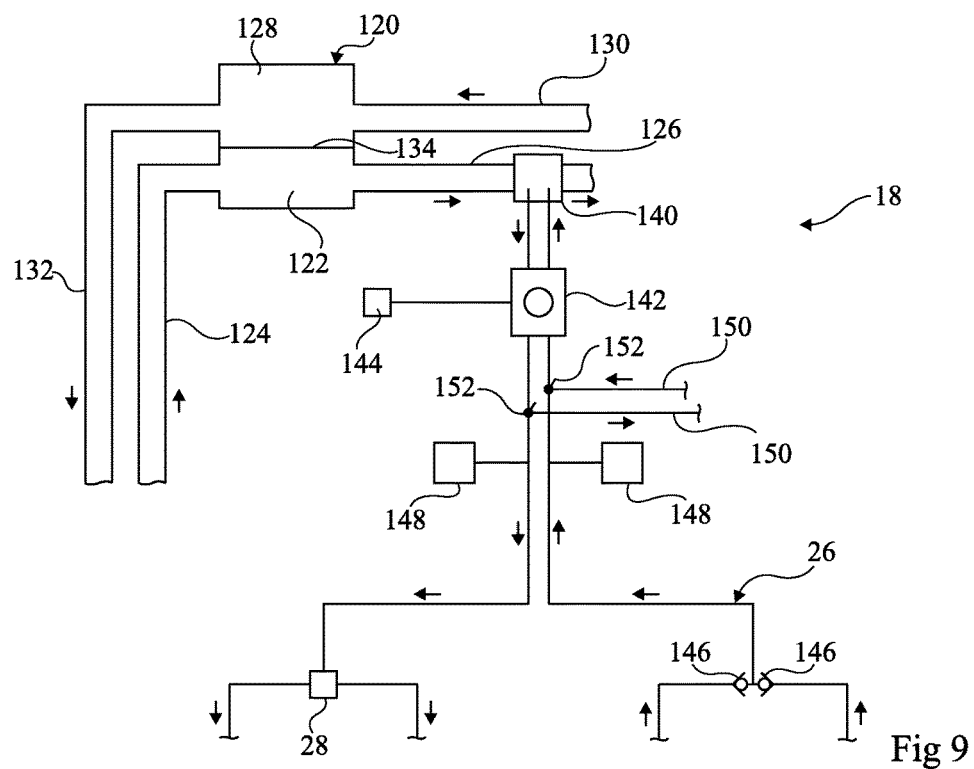
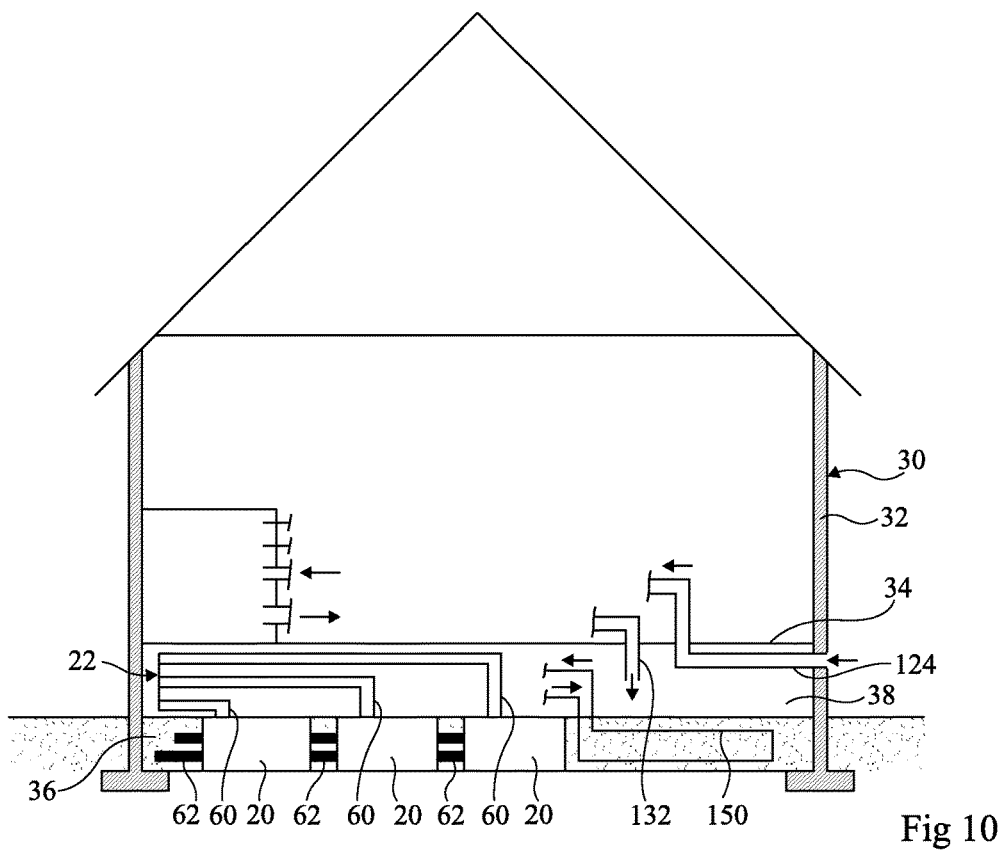
Fig 9
Fig 10

THERMAL ENERGY STORAGE SYSTEM

CROSS-REFERENCE TO RELATED APPLICATIONS

This application claims the priority benefit of French Patent Application No. 13/03020 filed on Dec. 20, 2013 and European Patent Application No. 14157768.4 filed on Mar. 5, 2014, the disclosures of which are hereby incorporated by reference in their entirety to the maximum extent allowable by law.

BACKGROUND OF THE INVENTION

Field of the Invention

The present disclosure relates to a thermal energy storage device comprising heat accumulators and a heating device, particularly a device for heating individual or collective dwellings, using the storage device.

Description of the Related Art

The use of heat accumulators for the heating of a house is known. Documents DE 10330139 and US2003/0000680 describe examples of such heating devices.

A disadvantage of known heating devices comprising heat accumulators is the low heating power capable of being obtained. Thereby, such heating devices are only generally used as a supplementary heating.

SUMMARY

An object of an embodiment is to overcome all or part of the disadvantages of the previously-described heating devices.

Another object of an embodiment is to have a significant quantity of thermal energy stored by the storage device.

Another object of an embodiment is to decrease the energy consumed for the storage of thermal energy in the thermal energy storage device.

Another object of an embodiment is for the volume of the heat accumulators of the thermal energy storage device to be small.

Thus, an embodiment provides a device comprising first and second heat accumulators, each comprising thermal energy storage containers, each container comprising an insulating enclosure containing earth crossed by at least one first line for the circulation of a first heat transfer fluid and at least one second line for the circulation of a second heat transfer fluid, the first line comprising a first end and a second end, the second lines of the containers of the first accumulator being series-connected and the second lines of the containers of the second accumulator being series-connected, the heating device comprising a device of thermal energy delivery to the first heat transfer fluid connected to the first and second accumulators by a first circuit for distributing the first heat transfer fluid comprising first and second elements for delivering the first heat transfer fluid and first and second elements for receiving the first heat transfer fluid, the first ends of the first lines of the containers of the first accumulator being connected in parallel to the first element for delivering the first heat transfer fluid, the second ends of the first lines of the containers of the first accumulator being connected in parallel to the first element for receiving the first heat transfer fluid, the first ends of the first lines of the second accumulator being connected in parallel to the second element for delivering the first heat transfer fluid and the second lines of the second accumulator being connected in parallel to the second element for receiving the first heat transfer fluid, the first distribution circuit being capable of selectively circulating the first heat transfer fluid in the first line of each container of the first accumulator or in the first line of each container of the second accumulator.

According to an embodiment, the device comprises a device for consuming the thermal energy of the second heat transfer fluid connected to the first and second accumulators by a second circuit for distributing the second heat transfer fluid capable of selectively circulating the second heat transfer fluid in the second line of each container of the first accumulator or in the second line of each container of the second accumulator.

According to an embodiment, in each container, the first line is arranged so that the first heat transfer fluid circulates in the enclosure along a first path and the second line is arranged so that the second heat transfer fluid circulates in the enclosure along a second path opposite to the first path.

According to an embodiment, each container takes up a volume smaller than 5 m3.

According to an embodiment, each container comprises a frame comprising radial rods supporting the first line and the second line.

According to an embodiment, the frame comprises a pipe delimiting in the enclosure a central volume of earth and a peripheral volume of earth, the first line mainly extending successively in the central volume and in the peripheral volume and the second line mainly extending successively in the peripheral volume and in the central volume.

According to an embodiment, for each container, the first line and/or the second line is at least partly arranged in a spiral within the enclosure.

According to an embodiment, the device for delivering thermal energy to the first heat transfer fluid comprises a water heater.

According to an embodiment, the device for consuming the thermal energy of the second heat transfer fluid comprises an air flow duct and a heat exchanger, between the second heat transfer fluid and the air conducted in the air flow duct connected to the second distribution circuit.

According to an embodiment, the thermal energy consumption device comprises a double-flow ventilation circuit intended to equip a house and comprising a first ventilation block capable of sucking in air from the outside of the house to the inside of the house via said duct and a second ventilation block capable of sucking in air from the inside of the house to the outside of the house and an air-air heat exchanger between the air sucked in by the first ventilation block and the air sucked in by the second ventilation block, the heat exchanger between the second heat transfer fluid and the air conducted in said duct being placed downstream of the first ventilation block along the air flow direction in said duct.

According to an embodiment, the second distribution circuit comprises a hydraulic circulator for circulating the second heat transfer fluid in the second distribution circuit and a programmer capable of controlling the hydraulic circulator and connected to a thermostat capable of measuring the temperature in the house.

According to an embodiment, the device comprises selectively circulating the first heat transfer fluid in the first line of each container of the first accumulator or in the first line of each container of the second accumulator.

According to an embodiment, the method comprises circulating the second heat transfer fluid in the first accumulator alone when the first heat transfer fluid is circulated in the second accumulator alone, and circulating the second heat transfer fluid in the second accumulator alone when the first heat transfer fluid is circulated in the first accumulator alone.

The foregoing and other features and advantages will be discussed in detail in the following non-limiting description of specific embodiments in connection with the accompanying drawings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 9 partially and schematically shows an embodiment of a thermal energy consumption device of the heating device of FIG. 1; and FIG. 10 is a lateral, partial, and simplified cross-section view of a house comprising another embodiment of the heating device.

Figure 1:
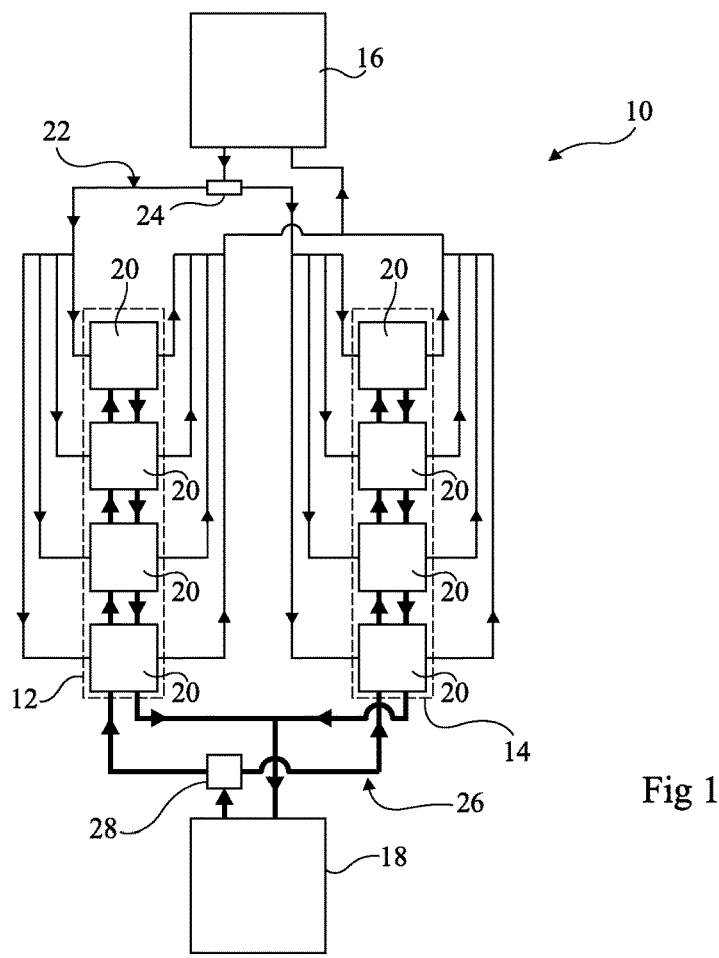
FIG. 1 partially and schematically shows an embodiment of a heating device.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts and screen shots are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DETAILED DESCRIPTION

The embodiments disclosed below are not intended to be exhaustive or limit the invention to the precise form disclosed in the following detailed description. Rather, the embodiments are chosen and described so that others skilled in the art may utilize their teachings. Further, in the following description, expressions "substantially", "around", and "approximately" mean "to within 10%". Further, only those elements which are necessary to the understanding of the present invention will be described and shown in the drawings. In particular, the structure and the operation of a solar water heater and of a double-flow ventilation are well known by those skilled in the art and are not described in detail.

FIG. 1 partially and schematically shows an embodiment of a heating device 10.

Heating device 10 comprises two thermal energy accumulators 12, 14, a thermal energy generation device 16 supplying heat accumulators 12, 14, and a device 18 for consuming the thermal energy stored in accumulators 12, 14. Thermal energy generation device 16 and accumulators 12, 14 form a thermal energy storage device.

Thermal energy generation device 16 may correspond to any type of device capable of supplying a first heat transfer fluid at high temperature. According to an embodiment, thermal energy generation device 16 comprises a water heater for the heating of the first heat transfer fluid, particularly a solar water heater where the water heater is connected to solar sensors, or a thermodynamic water heater where the water heater is connected to a heat pump. According to another embodiment, thermal energy generation device 16 comprises solar sensors capable of directly heating the first heat transfer fluid. Part of the thermal energy of the first heat transfer fluid supplied by device 16 is stored in heat accumulators 12, 14.

Thermal energy consumption device 18 may correspond to any type of device having an operation requiring a second heat transfer fluid at high temperature. According to an embodiment, device 18 comprises a double-flow ventilation, the second heat transfer fluid being used to heat the outer air sucked in by the ventilation. According to another embodiment, thermal energy consumption device 18 comprises a device of underfloor heating, particularly by the circulating the second heat transfer fluid in a floor. Part of the thermal energy stored in heat accumulators 12, 14 is used to heat the second heat transfer fluid used by consumption device 18.

The temperature of the first heat transfer fluid sup-plied by thermal energy generation device 16 and the temperature of the second heat transfer fluid received by thermal energy consumption device 18 particularly depend on the provided application. As an example, in the case where thermal energy consumption device 18 comprises a double-flow ventilation, the temperature of the first and second heat transfer fluids may be greater than 50° C., particularly approximately 70° C. As an example, in the case where thermal energy consumption device 18 comprises an underfloor heating device, the temperature of the first and second heat transfer fluids may be in the range from 30° C. to 40° C. Generally, the temperature of the first and second heat transfer fluids is in the range from 30° C. to 80° C.

Each heat accumulator 12, 14 comprises a plurality of elementary heat accumulators 20, called containers in the rest of the description. Each container 20 takes up a volume smaller than 5 m3, preferably in the range from 1 m3 to 5 m3, more preferably from 2 m3 to 3 m3. The number of containers 20 per accumulator 12, 14 depends on the total desired heat capacity. As an example, each accumulator 12, 14 may comprise from 2 to 10 containers, four containers 20 per accumulator 12, 14 being shown as an example in FIG. 1.

Thermal energy generation device 16 is connected to containers 20 by a circuit 22 for distributing the first heat transfer fluid heated by device 16. The first heat transfer fluid transported by distribution circuit 22 is, for example, a heat transfer liquid, particularly water or glycol. The lines of distribution circuit 22 are shown in thin lines in the drawings. Preferably, the first heat transfer fluid is, for each accumulator 12, 14, distributed in parallel to each container 20 of the accumulator. This advantageously enables to rapidly renew the quantity of thermal energy stored in each container 20, given that each container has a small volume.

Distribution circuit 22 comprises a selector 24, for example, a bypass, capable of selectively directing the first high-temperature heat transfer fluid delivered by device 16 to one or the other of accumulators 12 or 14. This advantageously enables to only carry out a thermal energy storage step in one of the two accumulators 12 or 14.

Thermal energy consumption device 18 is connected to containers 20 by a circuit 26 for distributing the second heat transfer fluid used by device 18. The second heat transfer fluid transported by distribution circuit 26 is, for example, a heat transfer liquid, particularly water or glycol. The lines of distribution circuit 26 are shown in thick lines in the drawings. Preferably, distribution circuit 26 connects, for each accumulator 12, 14, containers 20 of the accumulator in series, that is, the second heat transfer fluid successively crosses each container 20 of an accumulator 12 or 14 before returning to device 18. This advantageously provides a proper heating of the second heat transfer fluid. In the embodiment shown in FIG. 1, the second heat transfer fluid crosses, for each accumulator 12, 14, successively twice each container 20 of the accumulator, a first time from the bottom to the top of the drawing, and then a second time from the top to the bottom of the drawing. As a variation, the second heat transfer fluid may cross, for each accumulator 12, 14, a single time successively each container 20 of the accumulator.

Distribution circuit 26 comprises a selector 28, for example, a bypass, capable of selectively directing the second heat transfer fluid used by device 18 towards one or the other of accumulators 12 or 14. This advantageously enables to only draw thermal energy from one of the two accumulators 12 or 14.

The operation of devices 16, 18 and of selectors 24, 28 may be automatically or manually controlled. Advantageously, the first heat transfer fluid of distribution circuit 22 is circulated in one of accumulators 12 or 14 when the second heat transfer fluid of distribution circuit 26 is circulated in the other accumulator 12 or 14. Advantageously, it is thus avoided for the first heat transfer fluid of distribution circuit 22 and for the second heat transfer fluid of distribution circuit 26 to simultaneously circulate in containers 20 of the same accumulator 12 or 14.

According to another embodiment, heating device 10 may comprise more than two heat accumulators 12, 14. In this case, distribution circuits 22 and 26 are connected to each accumulator, the containers 20 of each accumulator being assembled in parallel on distribution circuit 22 and being series-assembled on distribution circuit 26.

In the embodiment shown in FIG. 1, a single distribution circuit 26 is shown. However, according to another embodiment, a plurality of thermal energy consumption devices 18 may be present and connected to accumulators 12 and 14 by independent distribution circuits 26.

Figure 2:
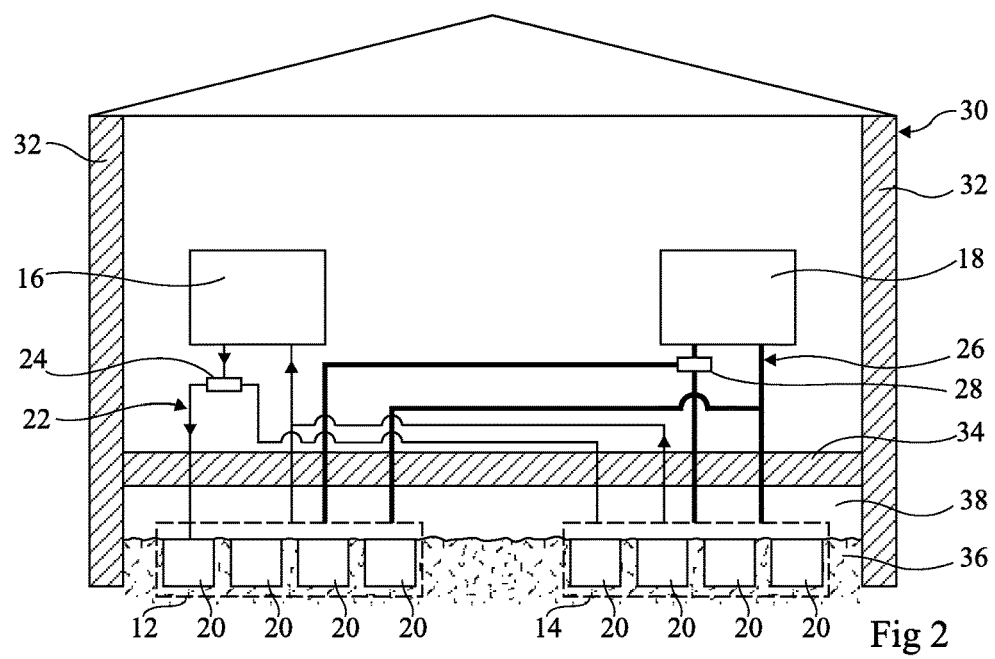
FIG. 2 is a lateral, partial, and simplified cross-section view of a house comprising the heating device according to the embodiment shown in FIG. 1.

FIG. 2 shows an example of installation of heating device 10 in a house 30. Distribution circuits 22 and 26 are only partially shown. According to an embodiment, house 30 comprises walls 32 and a floor 34. According to an embodiment, containers 20 of accumulators 12 and 14 are buried in ground 36 under floor 34. As an example, the upper end of each container 20 may be flush with the surface of ground 36 to ease the access to containers 20. The lines of distribution circuits 22, 26 are preferably insulated outside of containers 20, for example, by insulating sheaths.

According to an embodiment, a free space 38 is present between ground 36 and floor 34. Space 38 for example corresponds to a ventilation space or to a basement. It enables to easily access containers 20, particularly for their installation and for maintenance operations. As a variation, containers 20 of accumulators 12, 14 may be arranged in space 38 and lie on ground 36. According to another embodiment, containers 20 of accumulators 12 and 14 may be buried next to house 30.

Figure 3:
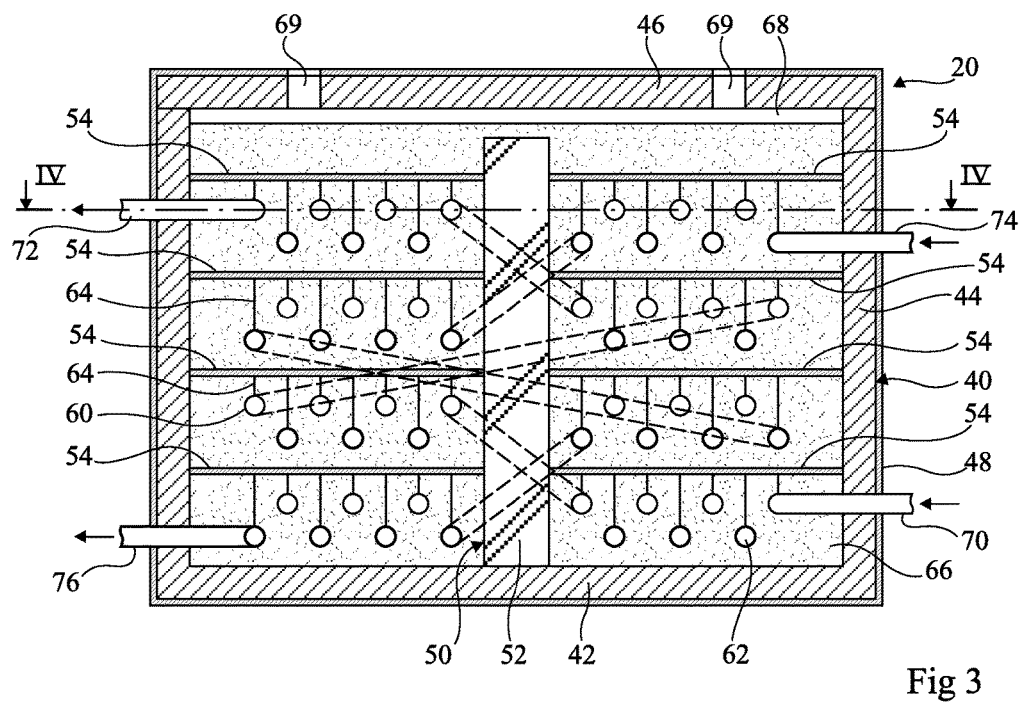
FIGS. 3 and 4 respectively are a side cross-section view and a top cross-section view of an embodiment of a thermal energy storage container.
Figure 4:
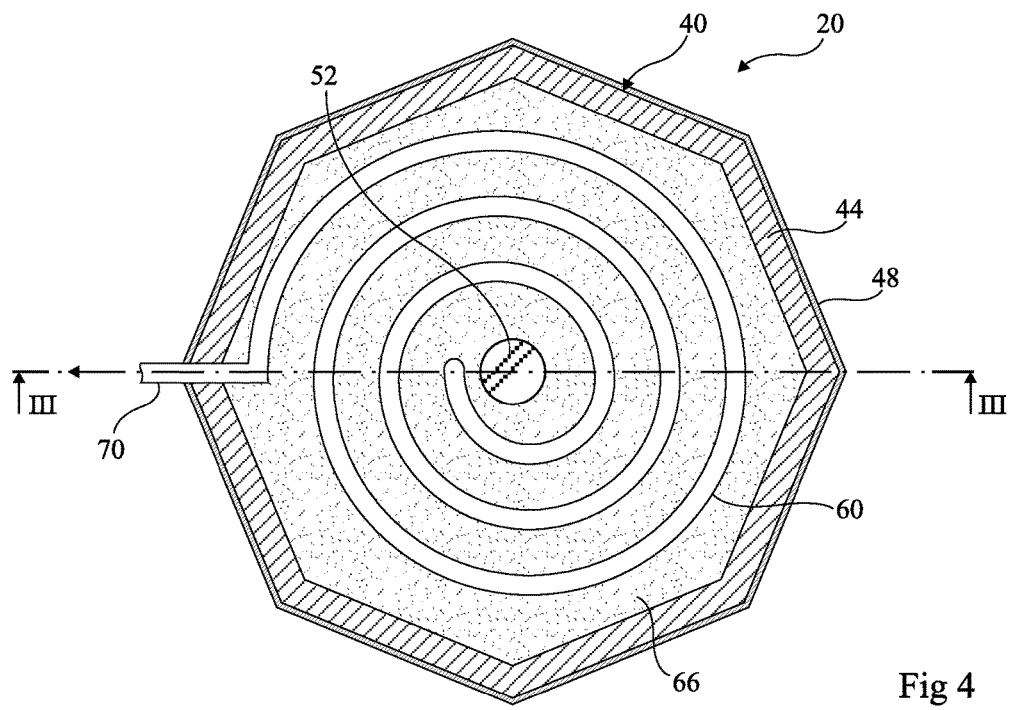

FIGS. 3 and 4 are cross-section views of an embodiment of a container 20. According to an embodiment, the volume occupied by container 20 is inscribed within a cylinder having a height smaller than or equal to 110 cm and having a diameter smaller than or equal to 170 cm. Container 20 comprises an enclosure 40 comprising a bottom 42, lateral walls 44, and a lid 46 formed by plates of thermally-insulating material, for example, polystyrene plates having a thickness greater than or equal to 4 cm. Lid 46, located at the top of container 20, may be removable and enable to access the internal volume of container 20. Enclosure 40 may be contained within a liner 48 of a tight material, for example, a plastic film. Liner 48 protects container 20 against water penetration risks.

Container 20 comprises a frame 50 comprising, for example, a central pillar 52, for example, cylindrical, made of an insulating material, and rigid rods 54 which extend radially from central pillar 52. Central pillar 52 for example has a height lower than or equal to 80 cm. Rods 54 are for example made of steel and have a diameter smaller than or equal to 1.5 cm. Lateral walls 44 of enclosure 40 may be maintained by rods 54, which may penetrate into the plates forming walls 44.

Each container 20 is crossed by a line 60 for trans-porting the first heat transfer fluid belonging to distribution circuit 22, and called thermal energy supply line 60 in the rest of the description. Line 60 is shown in thin lines in the drawings. Each container 20 is further crossed by a line 62 for transporting the second heat transfer fluid belonging to distribution circuit 26, and called thermal energy collection line 62 in the rest of the description. Line 62 is shown in thick lines in the drawings. Lines 60 and 62 are held by rods 54, for example, by fastening rods 64. Preferably, lines 60 and 62 are placed less than 5 cm away from a rod 54. As an example, lines 60, 62 are made of stainless steel and may have an inner diameter in the range from 10 mm to 5 cm.

Earth 66 is arranged in enclosure 40 to entirely cover lines 60 and 62. Earth 66 is preferably screened, for example, with a sieve having an aperture size in the range from 5 mm to 20 mm, for example, approximately 10 mm. Earth volume 66 contained in container 20 forms a thermal energy storage area. A space 68 filled with air may be provided between earth 66 and lid 46. As an example, the height of air-filled space 68 may be in the order of 5 cm. Openings 69 may be provided through liner 48 and lid 46 in communication with air-filled space 68. Since air-filled space 68 communicates with the outside through openings 69, the pressure in space 68 advantageously remains equal to the pressure outside of containers 20.

Preferably, lines 60 and 62 are arranged in enclosure 40 to be substantially regularly distributed within enclosure 40. According to the present embodiment, line 60 extends over a plurality of stages, for example, four substantially horizontal stages. On each stage, line 60 extends in a spiral around central pillar 52 and the spiral is connected, at at least one end, to the spiral of another stage. According to the present embodiment, line 62 extends across a plurality of stages, for example, four substantially horizontal stages. On each stage, line 62 extends in a spiral around central pillar 52 and the spiral is connected, at at least one end, to the spiral of another stage. According to an embodiment, the stages of line 60 are interleaved with the stages of line 62.

FIG. 3 shows respective inlet and outlet fittings 70 and 72 of line 60 and respective inlet and outlet fittings 74 and 76 of line 62. For each accumulator 12, 14, lines 62 of containers 20 are series-connected, that is, outlet fitting 76 of line 62 of a container 20 is connected to inlet fitting 74 of the next container and outlet fitting 76 of the last container 20 in the series of containers 20 is connected to the rest of distribution circuit 26. For each accumulator 12, 14, lines 60 of containers 20 are connected in parallel, that is, a single line of distribution circuit 22 divides to be connected to each inlet fitting 70 of line 60 of each container 20 and a single line of distribution circuit 22 divides to be connected to each outlet fitting 72 of line 60 of each container 20.

In operation, when the first heat transfer fluid cir-culates in line 60, thermal energy is released by the first heat transfer fluid into earth 66 and when the second heat transfer fluid circulates in line 62, thermal energy is transferred from earth 66 to the second heat transfer fluid. Rods 55, when they are made of steel, also take part in the heat transfers. According to an embodiment, in normal operation, the temperature in each container 20 may be substantially maintained at the temperature of the first heat transfer fluid supplied by thermal energy generation device 16, and depends on the thermal energy consumption device 18 used. As an example, the temperature in each container 20 is, in normal operation, in the range from 30° C. to 80° C.

Lines 60 and 62 are arranged in enclosure 40 so that the first heat transfer fluid in line 60 and the second heat transfer fluid in line 62 cross the internal volume of container 20 in operation along to opposite paths. As an example, the first heat transfer fluid is transported by line 60 from the bottom of container 20 to the top of container 20 and the second heat transfer fluid is transported by line 62 form the top of container 20 to the bottom of container 20. As a variation, the first heat transfer fluid is transported by line 60 from the top of container 20 to the bottom of container 20 and the second heat transfer fluid is transported by line 62 from the bottom of container 20 to the top of container 20.

Figure 5:
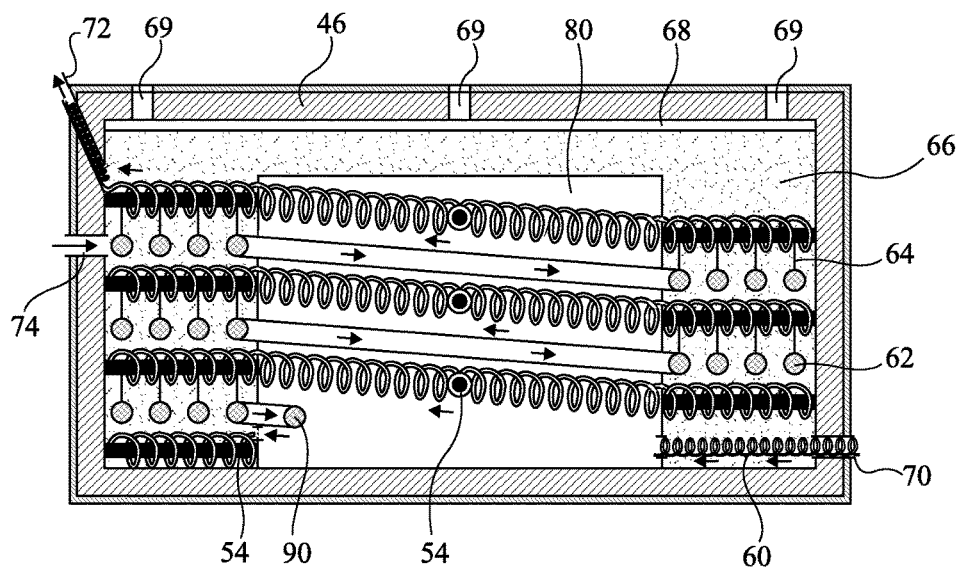
FIG. 5 is a side cross-section view of another embodiment of a thermal energy storage container.
Figure 6:
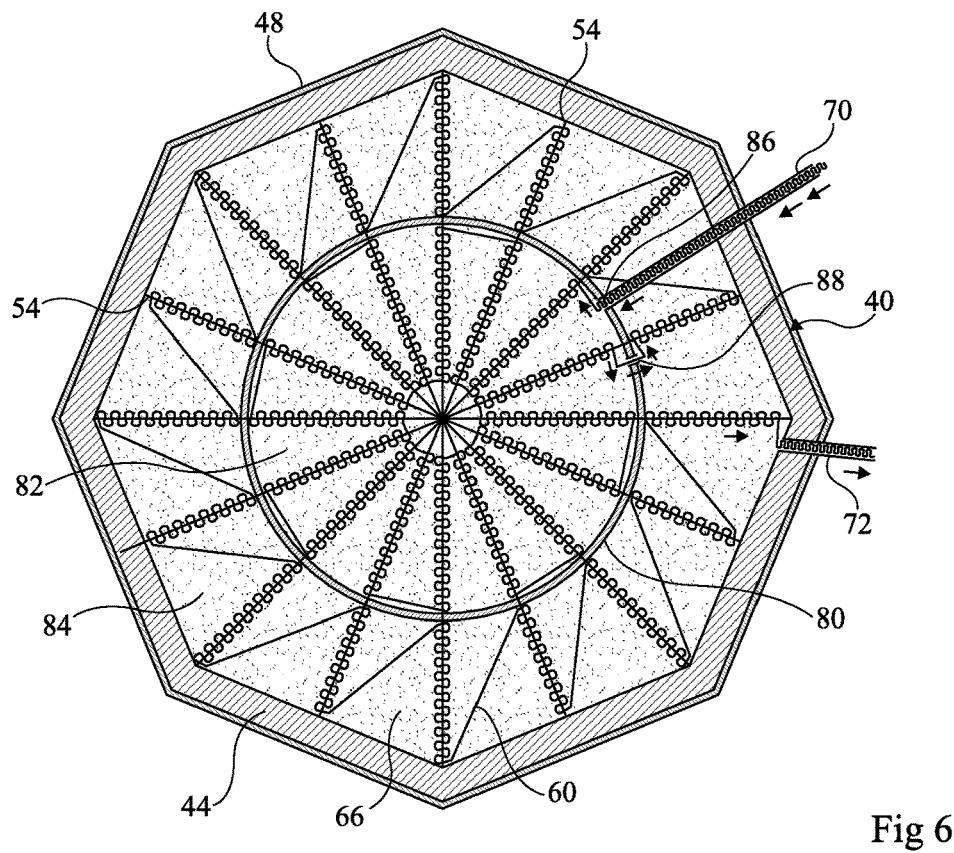
FIGS. 6 and 7 are simplified cross-section top views of the thermal energy storage container shown in FIG. 5 illustrating an embodiment of the line layout in the container.
Figure 7:
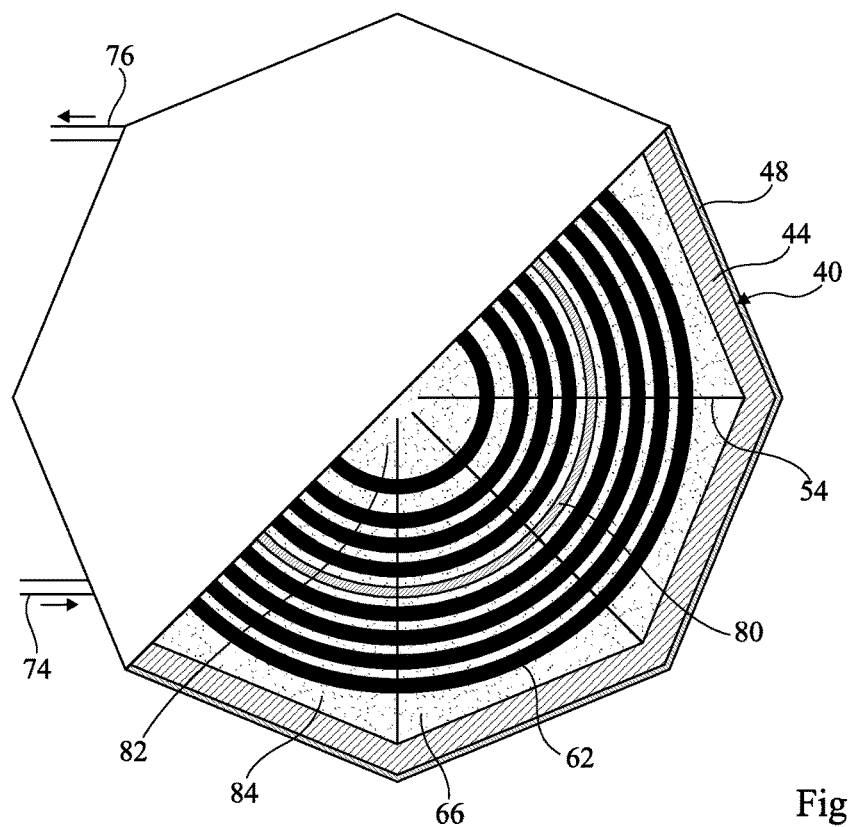

FIGS. 5, 6, and 7 show another embodiment of a container 20. The elements common with container 20 shown in FIGS. 3 and 4 are designated with the same reference numerals. According to the embodiment shown in FIGS. 5, 6, and 7, frame 50 comprises, instead of central pillar 52, a pipe 80, made of insulating material, for example, cardboard, holding rods 54. Pipe 80 delimits a central volume 82 and a peripheral volume 84 in enclosure 40, filled with earth. Rods 54 extend both in central volume 82 and in peripheral volume 84. As an example, the portion of each rod 54 in peripheral volume 82 is smaller than 30 cm. Pipe 80 preferably has a diameter smaller than or equal to 80 cm and a height smaller than or equal to 80 cm. Rods 55 may be distributed in a spiral around pipe 80.

In the embodiment illustrated in FIGS. 5, 6, and 7, thermal energy delivery line 60 is arranged in enclosure 40 so that the first heat transfer fluid transported by this line 60 first crosses central volume 82 and then peripheral volume 84 and thermal energy collection line 62 is arranged in enclosure 40 so that the second heat transfer fluid transported by line 62 first crosses peripheral volume 80, and then central volume 82. As an example, the first heat transfer fluid is transported by line 60, first in central volume 82 from the bottom to the top of container 20, and then in peripheral volume 84 from the bottom to the top and the second heat transfer fluid is transported by line 62 first in peripheral volume 84 from the top to the bottom of container 20, and then in central volume 82 from the top to the bottom of container 20.

In the embodiment illustrated in FIGS. 5, 6, and 7, thermal energy delivery line 60 is arranged in a helix around each rod 54.

FIG. 6 is a simplified flattened cross-section view which illustrates an example of layout of line 60. As shown in this drawing, line 60 penetrates into enclosure 40 from fitting 70 and directly extends all the way to pipe 80 that it crosses through a port 86 to penetrate into central volume 82. Line 60 crosses central volume 82 along a helix around each rod 54 and then comes out of central volume 82 through a port 88 to cross peripheral volume 84 by once again following helix around each rod 54. Line 60 comes out of enclosure 40 at the level of outlet fitting 72.

FIG. 7 is a simplified flattened cross-section view which illustrates an example of layout of line 62. As shown in this drawing, line 62 penetrates into enclosure 40 from fitting 74 and crosses peripheral volume 84 in a spiral, drawing closer to pipe 80, possible across a plurality of stages as appears in FIG. 5, and then crosses pipe 80 through a port 90 and then crosses central volume 82, in a spiral drawing away from pipe 80, possibly across a plurality of stages. Line 62 comes out of enclosure 40 at the level of outlet fitting 76.

In operation, in a phase of thermal energy storage in a container 20, when the first heat transfer fluid transported by line 60 reaches container 20, it starts by heating central volume 82. The first heat transfer fluid then is cooler when it reaches peripheral volume 84. Central volume 82 can then be at a higher average temperature than peripheral volume 84. In operation, in a phase of thermal power collection in a container 20, when the second heat transfer fluid transported by line 62 reaches container 20, it enters enclosure 40 and starts by collecting thermal energy from peripheral volume 84. The second heat transfer fluid is then pre-heated in peripheral volume 84 before reaching central volume 82 to have the final heating.

In the previously-described embodiments, a single thermal energy collection line 62 per container 20 is shown. However, according to another embodiment, a plurality of thermal energy collection lines may be arranged in a same container 20. Each thermal energy collection line then belongs to a different distribution circuit, where such distribution circuits may be connected to different thermal energy consumption devices 18.

Figure 8:
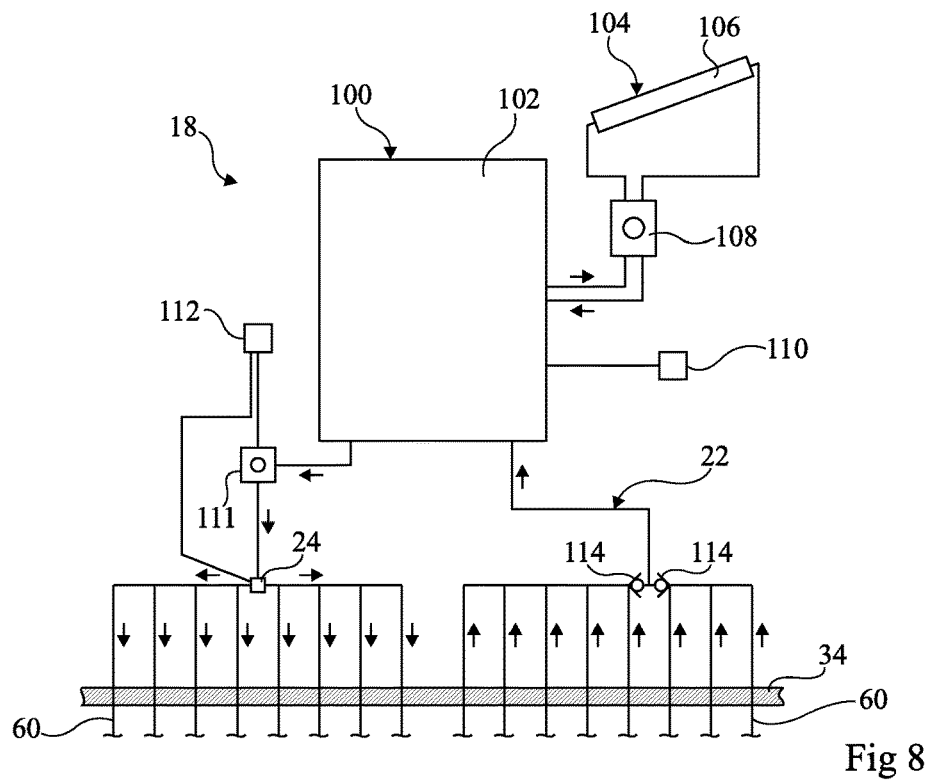
FIG. 8 partially and schematically shows an embodiment of a thermal energy generation device of the heating device of FIG. 1.

FIG. 8 shows an embodiment of thermal energy generation device 18 comprising a water heater 100. Water heater 100 preferably is a solar water heater. It comprises a tank 102 containing the first heat transfer fluid and a device 104 for heating the first heat transfer fluid with solar sensors. FIG. 8 schematically shows a solar sensor 106 and a pump 108 for circulating a heat transfer fluid heated by solar sensor 106 and used to heat the first heat transfer fluid in tank 102. Solar water heater 100 may further comprise a supplementary heating device, for example, an electric heating device, for the first heat transfer fluid contained in tank 102. The operation of water heater 100 may be controlled by a programmer 110, for example comprising a dedicated electronic circuit. Programmer 110 may control the water heater so that the temperature of the first heat transfer fluid contained in tank 102 is maintained substantially equal to a temperature reference.

As an example, programmer 110 enables to control the heating of the first heat transfer fluid with the supplementary electric heating device at the end of the day if the heating of the first heat transfer fluid due to solar sensors 106 has not been sufficient due to a lack of sunlight. The first heat transfer fluid may be circulated in distribution circuit 22 by a pump 111 controlled by a programmer 112 comprising, for example, a dedicated electronic circuit. Programmer 112 is further capable of controlling selector 24 to direct the first heat transfer fluid towards accumulator 12 or 14, not shown. FIG. 8 shows, on distribution circuit 22 downstream of accumulators 12 and 14, check valves 114 enabling to guide the circulation of the first heat transfer fluid downstream of accumulators 12 and 14 towards tank 102.

According to an embodiment, programmers 110 and 112 are capable of interchanging signals. Preferably, when programmer 112 controls the circulating of the first heat transfer fluid in distribution circuit 22, programmer 110 controls water heater 100 to prevent the starting of the electric heating device even if the temperature of the first heat transfer fluid in tank 102 decreases below the temperature reference.

As an example, the containers 20 of one of accumulators 12 may be heated for part of a night while the containers 20 of the other accumulator 14 may be heated for part of the next night.

According to an embodiment, the duration of circulation of the first heat transfer fluid within distribution circuit 22 is sufficiently long for the entire quantity of the first heat transfer fluid contained in tank 102 to have circulated in accumulator 12 or 14.

According to an embodiment, in normal operation, the decrease of the temperature of the first heat transfer fluid when it returns into tank 102, when the first heat transfer fluid is circulated in containers 20, is reduced since the temperature of each container 20 is preferably, in normal operation, close to the temperature of the first heat transfer fluid delivered by thermal energy generation device 16. Thereby, the energy necessary to heat the first heat transfer fluid in tank 102 is decreased.

As previously described, each container 20 occupies a small volume so that each container 20 can be heated with a small quantity of energy. In particular, the energy due to solar radiation in winter may be sufficient to heat the first heat transfer fluid in tank 102 so that the electric power consumption of water heater 100 may be decreased.

FIG. 9 shows an embodiment of thermal energy consumption device 18. In this embodiment, device 18 comprises a double-flow house ventilation circuit 120. Ventilation circuit 120 comprises a first ventilation block 122 which sucks in air from the outside of the house via a duct 124 and discharges this air into the house through a duct 126. Ventilation circuit 120 comprises a second ventilation block 128 which sucks in air from the inside of the house through a duct 130 and discharges this air outside of the house through a duct 132. In known fashion for a double-flow ventilation, the air sucked in from the outside is heated by the air discharged to the outside via an air-air heat exchanger 134.

Duct 126 for delivering air into the house may be divided into a plurality of ducts, not shown, each of them ending in an opening for blowing air into the house. Duct 130 for sucking air from the inside of the house may be divided into a plurality of ducts, not shown, which each end in an opening for extracting air from the house. According to an embodiment, each blowing opening is placed in a room at the top of a wall, close to the ceiling, and the blown air flow is preferably oriented substantially horizontally, particularly parallel to the ceiling. According to an embodiment, each extraction opening is placed in a room at the bottom of a wall, close to the floor, for example, vertically in line with a window. Thereby, a hot air flow supplied in a room and horizontally blown close to the ceiling progressively moves down towards the bottom of the room, driving along the air cooled by the window and the cold air present at the floor level.

Thermal energy consumption device 18 comprises a heat exchanger 140 connected to distribution circuit 26. Heat exchanger 140 is a liquid-air heat exchanger when the second heat transfer fluid is a liquid. Exchanger 140 is installed on duct 126 for delivering the air blown into the house, that is, downstream of first ventilation block 122 and of exchanger 134. The air conducted in duct 126 is heated by the second heat transfer fluid through exchanger 140. This is advantageous since the heating by exchanger 140 of the air conducted in line 126 may cause a water condensation which would adversely affect the proper operation of second ventilation block 122.

The second heat transfer fluid may be circulated in distribution circuit 26 by a hydraulic circulator 142 controlled by a programmer 144 comprising, for example, a dedicated electronic circuit. Programmer 144 may comprise a room thermostat placed inside of the house. Programmer 144 may then be capable of controlling the activation of hydraulic circulator 142 according to the temperature is the house measured by the room thermostat. Programmer 144 is further capable of controlling selector 28 to direct the second heat transfer fluid towards accumulator 12 or 14, not shown. FIG. 9 shows, on distribution circuit 26 downstream of accumulators 12 and 14, check valves 146 for guiding the circulation of the second heat transfer fluid downstream of accumulators 12 and 14 towards exchanger 140. Distribution circuit 26 may comprise expansion chambers 148 for absorbing the expansion of the second heat transfer fluid.

According to an embodiment, programmers 144 and 112 are capable of interchanging signals. Preferably, when programmer 112 controls selector 24 to circulate the first heat transfer fluid in accumulator 12, programmer 144 controls selector 28 for the circulating of the second heat transfer fluid in accumulator 14 and when programmer 112 controls selector 24 to circulate the first heat transfer fluid in accumulator 14, programmer 144 controls selector 28 to circulate the second heat transfer fluid in accumulator 12.

An additional line 150 for the circulation of the second heat transfer fluid may be provided. Line 150 may be connected to distribution network 26 by selectors 152, particularly bypasses, which may be manually actuated. Line 150 may be partly buried, particularly in ground 36 under ventilation space 38 so that the second heat transfer fluid circulating in additional line 150 is cooled by releasing energy into ground 36. Additional line 150 is then preferably not in contact with containers 20. The second heat transfer fluid may be circulated in additional container 150 by circulator 142 when selectors 152 are actuated. The circulating of the second heat transfer fluid in additional line 150 may be carried out during hot seasons to cool down, via exchanger 140, the air conducted in line 126 and blown into the house.

FIG. 10 is a drawing similar to FIG. 2 of another embodiment of heating device 10. FIG. 10 shows containers 20 of one of accumulators 12 and 14 and, partially, lines 62 and lines 60. Line 150 has further been shown as being buried in ground 36 under ventilation space 38.

According to an embodiment, duct 124 for sucking in air from the outside of the house crosses ventilation space 38. Accumulators 12 and 14 being arranged in ventilation space 38, they tend to heat up the ambient air in ventilation space 38. The outer air sucked into duct 124 is advantageously preheated as it crosses ventilation space 38.

According to an embodiment, duct 124 may divide, as it enters ventilation space 38, into a plurality of secondary ducts which join as they come out of ventilation space 38. This enables to slow down the air flow sucked into ventilation space 38 and to increase the heating of the sucked-in air.

According to an embodiment, the air conducted by discharge duct 132 is blown into ventilation space 38. This may cause a condensation of the air humidity in ventilation space 38, particularly due to the presence of accumulators 12, 14. Further, a slight overpressure may be obtained in the ventilation space, which favors the discharge of the damp air present in ventilation space 38 to the outside through the ports, not shown, conventionally provided for the ventilation of ventilation space 38.

Specific embodiments have been described. Various alterations, modifications, and improvements will readily occur to those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A device comprising a first heat accumulator and a second heat accumulator, each comprising thermal energy storage containers, each container comprising an insulating enclosure containing earth crossed by at least one first line for a circulation of a first heat transfer fluid and at least one second line for a circulation of a second heat transfer fluid, the at least one first line comprising a first end and a second end, the at least one second line of the containers of the first accumulator being series-connected and the at least one second line of the containers of the second accumulator being series-connected, a heating device comprising a device of thermal energy delivery to the first heat transfer fluid connected to the first and second accumulators by a first circuit for distributing the first heat transfer fluid comprising first and second elements for delivering the first heat transfer fluid and first and second elements for receiving the first heat transfer fluid, the first ends of the at least one first line of the containers of the first accumulator being connected in parallel to the first element for delivering the first heat transfer fluid, the second ends of the at least one first line of the containers of the first accumulator being connected in parallel to the first element for receiving the first heat transfer fluid, the first ends of the at least one first line of the second accumulator being connected in parallel to the second element for delivering the first heat transfer fluid and the at least one second line of the second accumulator being connected in parallel to the second element for receiving the first heat transfer fluid, the first distribution circuit being capable of selectively circulating the first heat transfer fluid in the at least one first line of each container of the first accumulator or in the at least one first line of each container of the second accumulator.

2. The device of claim 1, comprising a device for consuming the thermal energy of the second heat transfer fluid connected to the first and second accumulators by a second circuit for distributing the second heat transfer fluid capable of selectively circulating the second heat transfer fluid in the at least one second line of each container of the first accumulator or in the at least one second line of each container of the second accumulator.

3. The device of claim 1, wherein, in each container, the at least one first line is arranged so that the first heat transfer fluid circulates in the enclosure along a first path and the at least one second line is arranged so that the second heat transfer fluid circulates in the enclosure along a second path opposite to the first path.

4. The device of claim 1, wherein each container takes up a volume smaller than 5 m$^3$.

5. The device of claim 1, wherein each container comprises a frame comprising radial rods for supporting the at least one first line and the at least one second line.

6. The device of claim 5, wherein the frame comprises a pipe delimiting in the enclosure a central volume of earth and a peripheral volume of earth, the at least one first line mainly extending successively in the central volume and in the peripheral volume and the at least one second line mainly extending successively in the peripheral volume and in the central volume.

7. The device of claim 1, wherein, for each container, the at least one first line and/or the at least one second line is at least partly arranged in a spiral in the enclosure.

8. The device of claim 1, wherein the device for delivering thermal energy to the first heat transfer fluid comprises a water heater.

9. The device of claim 2, wherein the device for consuming the thermal energy of the second heat transfer fluid comprises an air flow duct and a heat exchanger between the second heat transfer fluid and an air conducted in the air flow duct, connected to the second distribution circuit.

10. The device of claim 9, wherein the thermal energy consumption device comprises a double-flow ventilation circuit intended to equip a house and comprising a first ventilation block capable of sucking in air from the outside of the house to the inside of the house through said duct and a second ventilation block capable of sucking in air from the inside of the house to the outside of the house and an air-air heat exchanger between the air sucked in by the first ventilation block and the air sucked in by the second ventilation block, the heat exchanger between the second heat transfer fluid and the air conducted in said duct being placed downstream of the first ventilation block according to the air flow direction in said duct.

11. The device of claim 10, wherein the second distribution circuit comprises a hydraulic circulator for circulating the second heat transfer fluid in the second distribution circuit and a programmer capable of controlling the hydraulic circulator and connected to a thermostat capable of measuring the temperature in the house.

* * * * *